US010659122B2

(12) United States Patent
Chang et al.

(10) Patent No.: US 10,659,122 B2
(45) Date of Patent: May 19, 2020

(54) COMMUNICATION DEVICE AND ANTENNA SELECTION METHOD

(71) Applicant: Wistron NeWeb Corp., Hsinchu (TW)

(72) Inventors: Huai-Ming Chang, Hsinchu (TW); Tsun-Che Huang, Hsinchu (TW); Yu Tao, Hsinchu (TW); Fu-Ming Kang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 286 days.

(21) Appl. No.: 15/907,135

(22) Filed: Feb. 27, 2018

(65) Prior Publication Data

US 2019/0268050 A1    Aug. 29, 2019

(51) Int. Cl.
| | | |
|---|---|---|
| *H04B 7/06* | (2006.01) | |
| *H01Q 1/00* | (2006.01) | |
| *H04B 7/0417* | (2017.01) | |
| *H04B 7/08* | (2006.01) | |
| *H04W 24/02* | (2009.01) | |

(52) U.S. Cl.
CPC ........... *H04B 7/0608* (2013.01); *H01Q 1/007* (2013.01); *H04B 7/0417* (2013.01); *H04B 7/086* (2013.01); *H04W 24/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,079,868 | B2* | 7/2006 | Guo | H04B 7/0634 370/335 |
| 8,942,659 | B2* | 1/2015 | Gulati | H04B 1/44 455/272 |
| 2009/0067513 | A1* | 3/2009 | Kim | H04B 7/0413 375/260 |
| 2010/0272204 | A1* | 10/2010 | Fazel | H04B 7/0608 375/267 |
| 2014/0176310 | A1* | 6/2014 | Kotlicki | G08C 17/02 340/12.5 |
| 2017/0271748 | A1* | 9/2017 | Ku | H01Q 1/243 |
| 2019/0246295 | A1* | 8/2019 | Chang | H04W 24/08 |

* cited by examiner

*Primary Examiner* — Mamadou L Diallo

(57) ABSTRACT

A communication device includes a smart antenna, a storage device, and a processor. The smart antenna is capable of switching between a plurality of antenna modes. In each of the antenna modes during a training stage, the smart antenna receives a first feedback datum, and the processor calculates a reward indicator according to the first feedback datum. The processor compares all of the reward indicators with each other and controls the smart antenna to select a specific mode of the antenna modes according to a comparison between all of the reward indicators. In the specific mode, the smart antenna receives a second feedback datum, the processor determines the weight function of the first feedback datum and the second feedback datum of the specific mode, and the processor updates the reward indicator of the specific mode according to the weight function.

18 Claims, 5 Drawing Sheets

COMMUNICATION DEVICE AND ANTENNA SELECTION METHOD

BACKGROUND OF THE INVENTION

Field of the Invention

The disclosure generally relates to a communication device, and more particularly to a communication device for use in the field of smart antennas.

Description of the Related Art

With advancements in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Communication devices with smart antennas allow mobile devices in the room to connect to the Internet at a high speed. Generally, smart antennas can switch between multiple modes. It has become a critical challenge for antenna designers to design a standard process for controlling smart antennas, which can automatically select the best mode for wireless communication.

BRIEF SUMMARY OF THE INVENTION

In an exemplary embodiment, the invention is directed to a communication device for communicating with an external device. The communication device includes a smart antenna, a storage device, and a processor. The smart antenna is capable of switching between a plurality of antenna modes. In each of the antenna modes during a training stage, the smart antenna transmits a first test datum and receives a first feedback datum in response to the first test datum, the processor calculates a reward indicator according to the first feedback datum, and the storage device stores the reward indicator. During a first working stage, the processor compares all of the reward indicators with each other, and controls the smart antenna to select a specific mode of the antenna modes according to a comparison between all of the reward indicators. In the specific mode during the first working stage, the smart antenna transmits a second test datum and receives a second feedback datum in response to the second test datum, the processor determines a weight function of the first feedback datum and the second feedback datum of the specific mode, and the processor updates the reward indicator of the specific mode according to the weight function.

In another exemplary embodiment, the invention is directed to a method for antenna selection. The method includes the steps of: communicating with an external device via a communication device, wherein the communication device includes a smart antenna which is capable of switching between a plurality of antenna modes; in each of the antenna modes during a training stage, transmitting a first test datum and receiving a first feedback datum in response to the first test datum, and calculating a reward indicator according to the first feedback datum; during a first working stage, comparing all of the reward indicators with each other, and controlling the smart antenna to select a specific mode of the antenna modes according to a comparison between all of the reward indicators; and in the specific mode during the first working stage, transmitting a second test datum and receiving a second feedback datum in response to the second test datum, determining the weight function of the first feedback datum and the second feedback datum of the specific mode, and updating the reward indicator of the specific mode according to the weight function.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
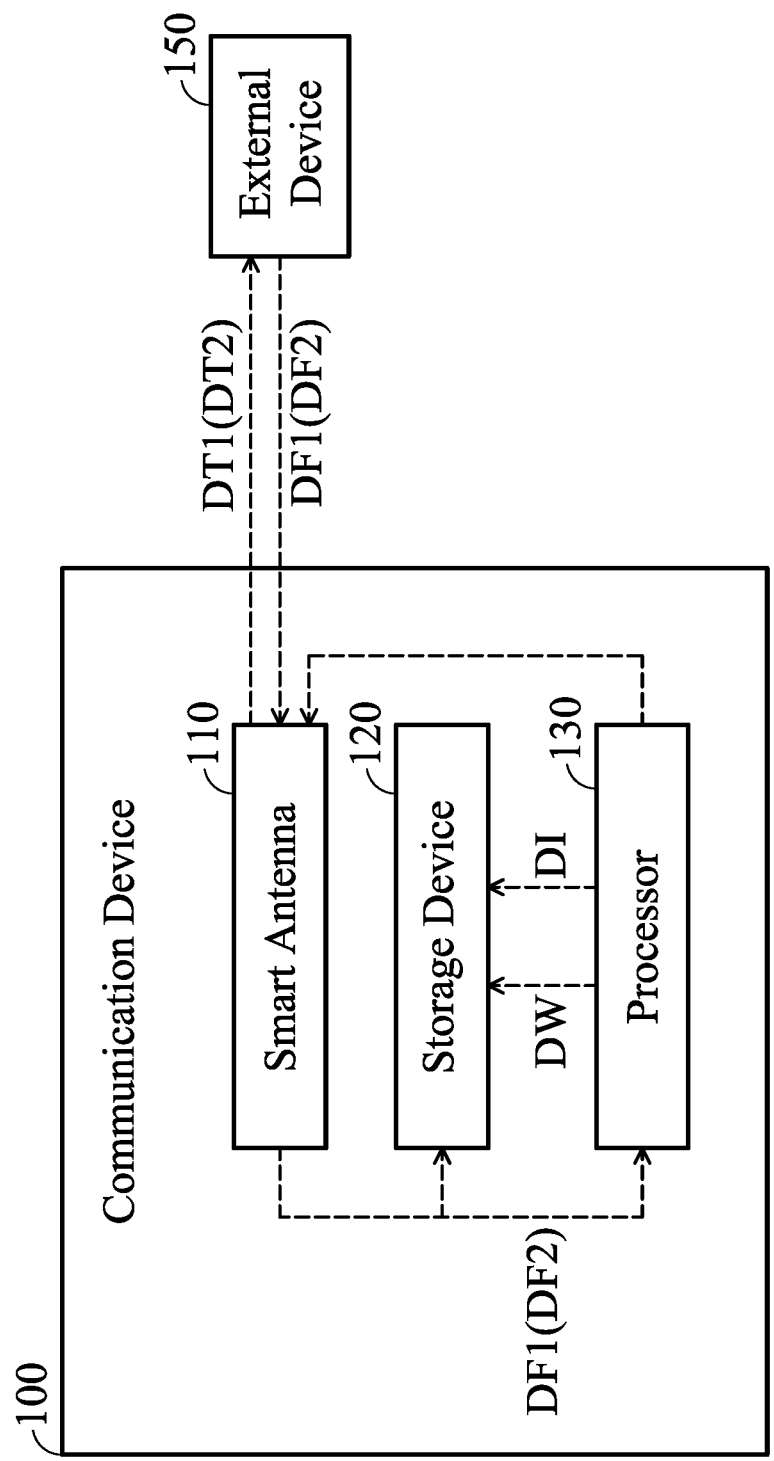
FIG. 1 is a diagram of a communication device according to an embodiment of the invention.

FIG. 1 is a diagram of a communication device 100 according to an embodiment of the invention. The communication device 100 can wirelessly communicate with an external device 150. The external device 150 may be separate from the communication device 100. For example, the communication device 100 may be a server end, such as a wireless access point, and the external device 150 may be a client end, such as a mobile device, but they are not limited thereto. As shown in FIG. 1, the communication device 100 includes a smart antenna 110, a storage device 120, and a processor 130. The smart antenna 110 is capable of switching between a plurality of different antenna modes, so as to communicate with the external device 150 using the selected/switched antenna mode. The storage device 120 can include any one of a combination of volatile memory elements (e.g., random-access memory (RAM, such as DRAM, and SRAM, etc.)) or nonvolatile memory elements. The processor 130 may include any custom-made or commercially available processor, a central processing unit (CPU), an auxiliary processor, a semiconductor-based microprocessor, a macro-processor, one or more application specific integrated circuits (ASICs), a plurality of suitably configured digital logic gates, or other well known electrical configurations including discrete elements both individually and in various combinations to coordinate the overall operation of the computing system. In some embodiments, the storage device 120 can store computer software. The processor 130 is configured to execute the computer software stored in the storage device 120, and control the smart antenna 110 and perform the steps and operations of the invention. In alternative embodiments, the storage device 120 and the processor 130 are implemented with hardware logic circuitry to control the smart antenna 110 and perform the steps and operations of the invention.

Figure 2:
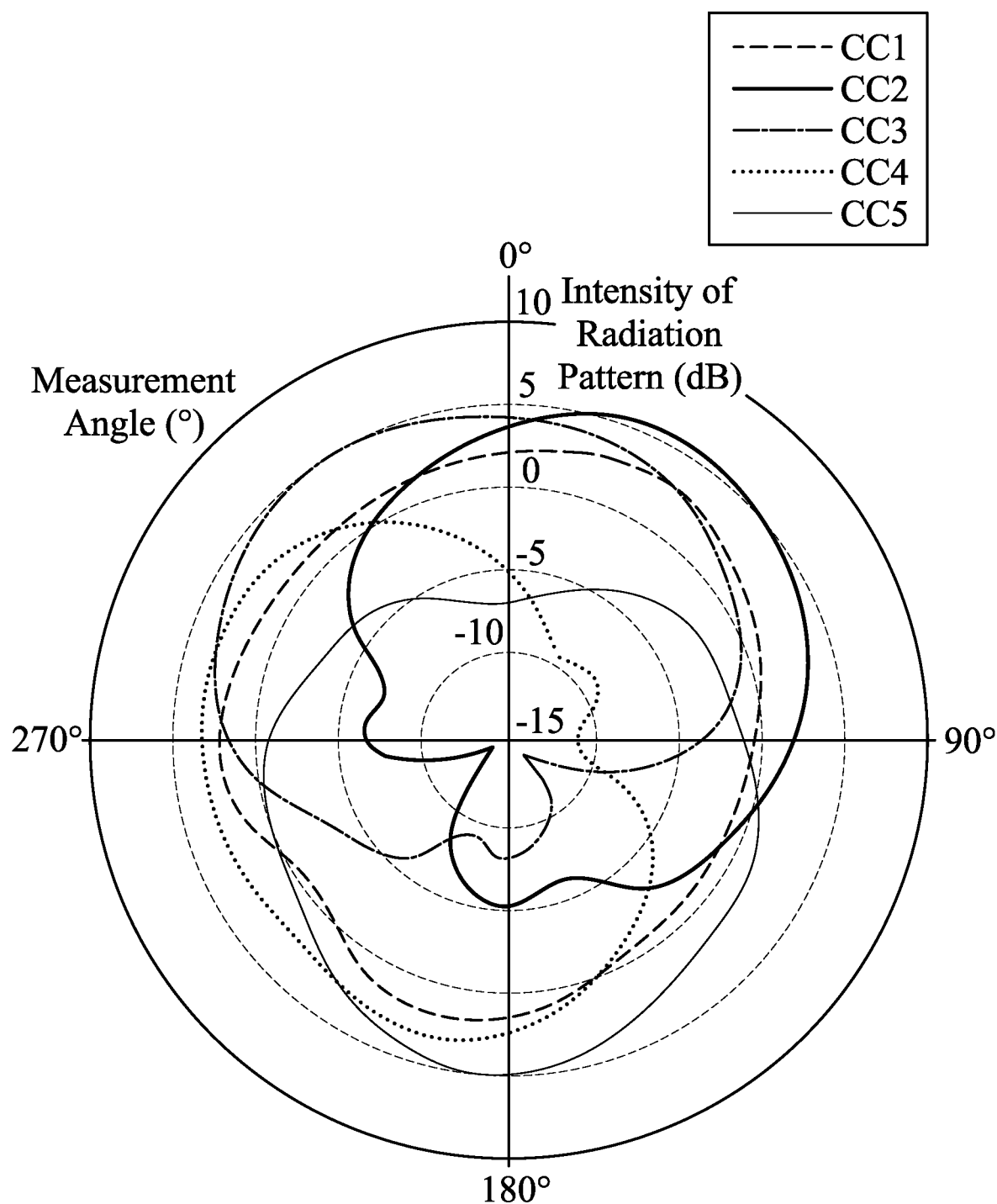
FIG. 2 is a diagram of a smart antenna operating in different antenna modes according to an embodiment of the invention.

FIG. 2 is a diagram of the smart antenna 110 operating in different antenna modes according to an embodiment of the invention. In the embodiment of FIG. 2, the aforementioned antenna modes include different radiation patterns. For example, as shown in FIG. 2, a first curve CC1, a second curve CC2, a third curve CC3, a fourth curve CC4, and a fifth curve CC5 may represent five different radiation patterns of the smart antenna 110. Specifically, the first curve CC1 may be an omnidirectional radiation pattern, and the other curves CC2 to CC5 may be respective directional radiation patterns. The shapes of the aforementioned radiation patterns are adjustable according to different requirements. The processor 130 can control the smart antenna 110 to selectively use one of the different radiation patterns (e.g., one of CC1 to CC5) for wirelessly communicating with the external device 150. It should be understood that the smart antenna 110 may have fewer or more radiation patterns although there are exactly five radiation patterns displayed in FIG. 2.

Figure 3:
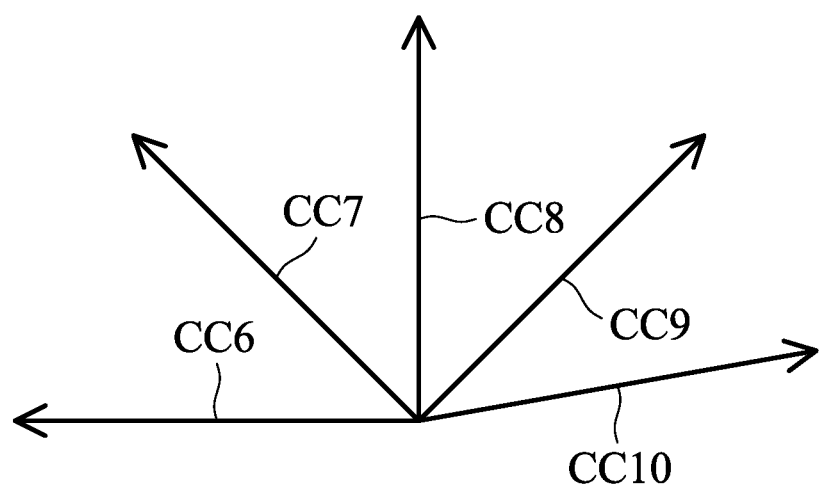
FIG. 3 is a diagram of a smart antenna operating in different antenna modes according to another embodiment of the invention.

FIG. 3 is a diagram of the smart antenna 110 operating in different antenna modes according to another embodiment of the invention. In the embodiment of FIG. 3, the aforementioned antenna modes include different polarization directions. For example, as shown in FIG. 3, a sixth curve CC6, a seventh curve CC7, an eighth curve CC8, a ninth curve CC9, and a tenth curve CC10 may represent five different polarization directions of the smart antenna 110. Specifically, the sixth curve CC6 may be a horizontal polarization direction, and the eighth curve CC8 may be vertical polarization direction. The orientations of the aforementioned polarization directions are adjustable according to different requirements. The processor 130 can control the smart antenna 110 to selectively use one of the different polarization directions (e.g., one of CC6 to CC10) for wirelessly communicating with the external device 150. It should be understood that the smart antenna 110 may have fewer or more polarization directions although there are exactly five polarization directions displayed in FIG. 3.

Generally, the processor 130 can control the smart antenna 110 to switch to all of the antenna modes one after another. Next, the processor 130 can evaluate feedback data relative to the antenna modes and accordingly select a specific mode among them. The following embodiments will describe the operations in each of the antenna modes during a training stage of the communication device 100. There may be one or more working stages after the training stage, and they will be discussed later. It should be understood that if there are N antenna modes ("N" is a positive integer) of the smart antenna 110, the following procedure may be performed N times for respectively testing the N antenna modes. In the beginning, the smart antenna 110 transmits a first test datum DT1 and then receives a first feedback datum DF1 in response to the first test datum DT1. In some embodiments, the smart antenna 110 transmits the first test datum DT1 to the external device 150 and then receives the first feedback datum DF1 from the external device 150, but it is not limited thereto. The first feedback datum DF1 may be determined according to the first test datum DT1. For example, the first test datum DT1 may include a pulse signal, and the first feedback datum DF1 may include RSSI (Received Signal Strength Indicator), EVM (Error Vector Magnitude), or goodput measured from the external device 150, but they are not limited thereto. Then, the processor 130 calculates a reward indicator DI according to the first feedback datum DF1. In some embodiments, the first feedback datum DF1 includes RSSI measured from the external device 150, and the reward indicator DI is a function of the RSSI. For example, the function may be linear, and the reward indicator DI may be proportional to the RSSI, but it is not limited thereto. The storage device 120 can store the first feedback datum DF1 and the reward indicator DI in each of the antenna modes. The processor 130 can write data into the storage device 120 or read data from the storage device 120. For example, after N antenna modes ("N" is a positive integer) of the smart antenna 110 are evaluated by the processor 130 during the training stage, the storage device 120 may store N first feedback data DF1 and N reward indicators DI, which correspond to the N antenna modes, respectively.

During the first working stage of the communication device 100 (e.g., the first working stage may follow the training stage), after all of the antenna modes of the smart antenna 110 are evaluated and their corresponding reward indicators DI are calculated, the processor 130 compares all of the reward indicators DI with each other, and controls the smart antenna 110 to select a specific mode of the antenna modes according to the comparison between all of the reward indicators DI. For example, if the processor 130 obtains N reward indicators DI corresponding to N antenna modes of the smart antenna 110 ("N" is a positive integer), the processor 130 may select a specific reward indicator among the N reward indicators and determine the specific mode corresponding to the specific reward indicator. In some embodiments, the specific mode corresponds to the maximum of all of the reward indicators DI. That is, during the first working stage, the processor 130 selects one of the antenna modes as the specific mode, and the reward indicator DI of the selected antenna mode is the largest one among all of the reward indicators DI.

During the first working stage, next, the smart antenna 110 switches to the specific mode of the antenna modes (i.e., the specific mode is selected). The smart antenna 110 operating in the specific mode transmits a second test datum DT2 and then receives a second feedback datum DF2 in response to the second test datum DT2. In some embodiments, the smart antenna 110 operating in the specific mode transmits the second test datum DT2 to the external device 150 and then receives the second feedback datum DF2 from the external device 150, but it is not limited thereto. The second feedback datum DF2 may be determined according to the second test datum DT2. For example, the second test datum DT2 may include a pulse signal, and the second feedback datum DF2 may include RSSI (Received Signal Strength Indicator), EVM (Error Vector Magnitude), or goodput measured from the external device 150, but they are not limited thereto. The processor 130 determines a weight function DW of the first feedback datum DF1 and the second feedback datum DF2 of the specific mode. In some embodiments, the weight function DW depends on the first feedback datum DF1 multiplied by a first weighting factor and the second feedback datum DF2 multiplied by a second weighting factor. The second weighting factor may be the same as or different than the first weighting factor. For example, the ratio of the second weighting factor to the first weighting factor may be 0.25, 0.5, 1, 2, or 4, but it is not limited thereto. Then, the processor 130 updates the reward indicator DI of the specific mode according to the weight function DW. The storage device 120 can store the second feedback datum DF2, the weight function DW, and the updated reward indicator DI of the specific mode.

During a second working stage of the communication device 100 (e.g., the second working stage may follow the first working stage), after the reward indicator DI of the specific mode is updated, the processor 130 compares all of the reward indicators DI (including the updated reward indicator DI) with each other again, and controls the smart antenna 110 to update the specific mode according to the updated comparison between all of the reward indicators DI. The mechanism of the updated comparison during the second working stage may be the same as that of the comparison during the first working stage. For example, the updated specific mode may correspond to the maximum of all of the reward indicators DI (including the updated reward indicator DI). The updated specific mode selected during the second working stage may be the same as or different than the specific mode selected during the first working stage. For example, if there are N antenna modes ("N" is a positive integer) of the smart antenna 110, the specific mode selected according to the comparison during the first working stage may be an N-th antenna mode, and the updated specific mode selected according to the updated comparison during the second working stage may be a (N−1)-th antenna mode, but they are not limited thereto. During the second working stage, next, the smart antenna 110 switches to the updated specific mode of the antenna modes. The smart antenna 110 operating in the updated specific mode may transmit a third test datum to the external device 150 and then receives a third feedback datum from the external device 150 (not shown). It should be understood that there may be more following working stages whose operations are similar to those of the first and second working stages, and they will not be described again here.

In some embodiments, the reward indicator of an i-th antenna mode ("i" is a positive integer) is determined or updated by the processor 130 according to the following equations (1) to (6).

$$\overline{R_1}(1) = R_i(1) \text{ for } n = 1 \quad (1)$$

$$\overline{R_1}(n) = \frac{\sum_{j=1}^{n} R_i(j)}{n} \text{ for } n \geq 2 \quad (2)$$

$$\overline{R_1}(n-1) = \frac{\sum_{j=1}^{n-1} R_i(j)}{n-1} \text{ for } n \geq 2 \quad (3)$$

-continued $$\overline{R_1}(n) = \frac{(r^{n_i(n-1)} - 1) \cdot \overline{R_1}(n-1) + r^{n_i(n-1)} \cdot (r-1) \cdot R_i(n)}{r^{n_i(n-1)+1} - 1} \quad (4)$$

if the i-th antenna mode is selected $$\overline{R_1}(n) = \overline{R_1}(n-1) \text{ if the } i\text{-}th \text{ antenna mode is not selected} \quad (5)$$

$$n = \sum_{i=1}^{N} n_i \quad (6)$$

wherein "n" represents a current time integer (e.g., there may be continuous n time frames, and the current time frame is an n-th time frame), "$n_i$" represents a total selection number of the i-th antenna mode (e.g., the i-th antenna mode has been selected as the specific mode $n_i$ times for a time interval from a 1st time frame to the n-th time frame), "$R_i(n)$" represents a (current) reward indicator of the i-th antenna mode measured in the n-th time frame, "r" represents a weighting parameter, "$\overline{R}_1(n)$" represents the average of (current or historical) reward indicators of the i-th antenna mode measured during a time interval from the 1st time frame to the n-th time frame, "$\overline{R}_1(n-1)$" represents an average of (historical) reward indicators of the i-th antenna mode measured during a time interval from the 1st time frame to a (n−1)-th time frame, and "N" represents the total number of antenna modes.

It should be noted that "$\overline{R}_1(n)$" also represents the updated reward indicator of the i-th antenna mode measured in the n-th time frame (i.e., the current time frame). According to the equations (1) to (6), if the i-th antenna mode is not selected as the specific mode in the current time frame, the reward indicator DI of the i-th antenna mode measured in the n-th time frame will be unchanged and the same as a previous average of the historical reward indicators DI of the i-th antenna mode measured during the time interval from the 1st time frame to the (n−1)-th time frame; conversely, if the i-th antenna mode is selected in the current time frame, the updated reward indicator DI of the i-th antenna mode measured in the n-th time frame will be determined according to the weight function of a current reward indicator DI of the i-th antenna mode measured in the n-th time frame and the previous average of the historical reward indicators DI of the i-th antenna mode measured during the time interval from the 1st time frame to the (n−1)-th time frame.

Figure 4:
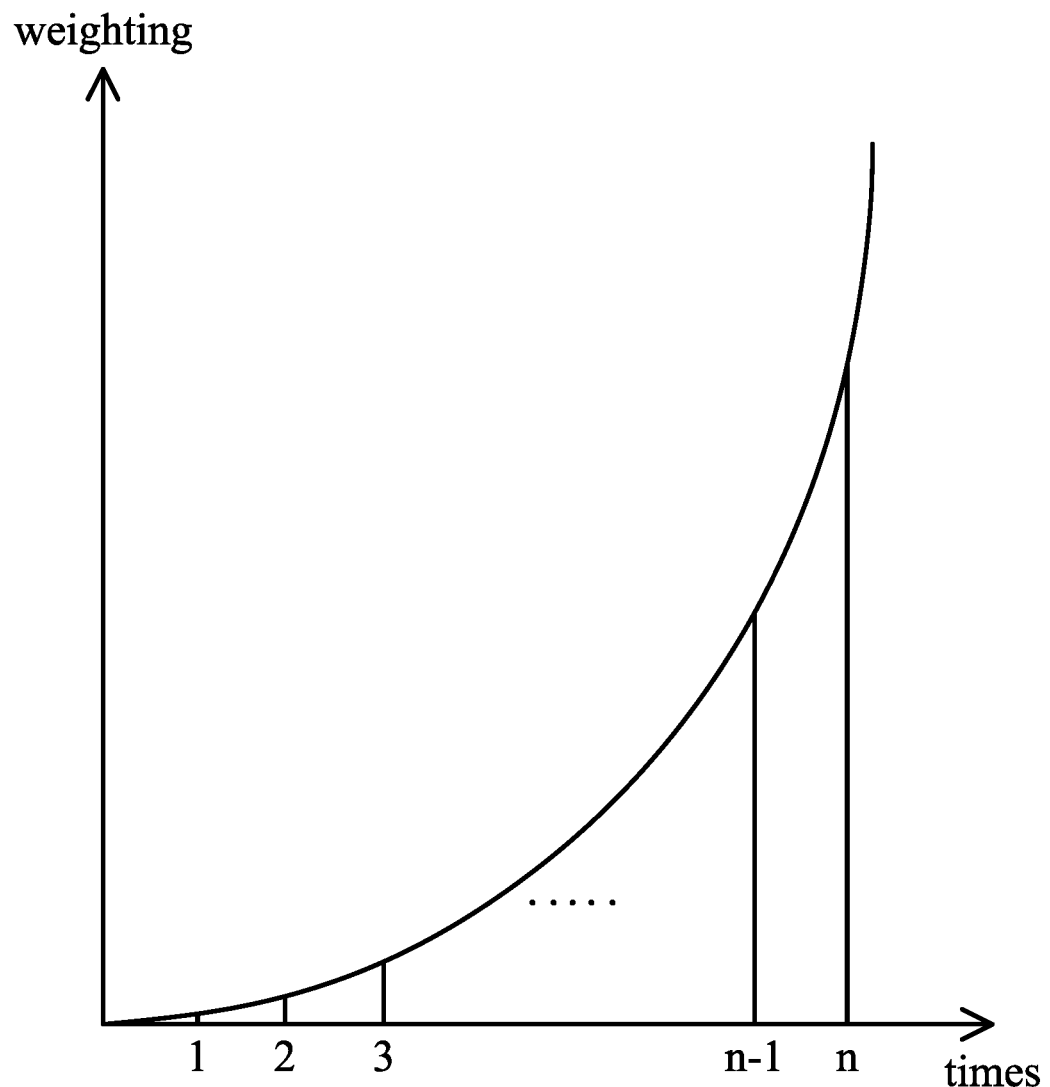
FIG. 4 is a diagram of performance of a weight function according to an embodiment of the invention.

FIG. 4 is a diagram of performance of the weight function DW using the equation (4) according to an embodiment of the invention. As shown in FIG. 4, if the equation (4) is applied to the weight function DW, the reward indicator DI of the specific mode is updated with exponential-growth weighting over time. That is, although the updated reward indicator DI of the specific mode is determined by its current reward indicator DI (e.g., $R_i(n)$) and its historical reward indicators DI (e.g., $\overline{R}_1(n-1)$), the current reward indicator DI (e.g., $R_i(n)$) has more dominant weighting than the historical reward indicators DI (e.g., $\overline{R}_1(n-1)$). According to practical measurements, such a design can effectively reduce the learning time of the smart antenna 110 of the communication device 100, and therefore the communication device 100 can be quickly fine-tuned to adapt to a variety of time-variant environments. The weighting parameter r is used to adjust the weighting of the historical reward indicators DI. If the weighting parameter r becomes higher, the weighting of the historical reward indicators DI will become lower. Conversely, if the weighting parameter r becomes lower, the weighting of the historical reward indicators DI will become higher. In some embodiments, the weighting parameter r should be greater than 1, such as 1.001. The above range of the weighting parameter r is calculated and determined according to many experiment results, and it helps to optimize the performance of the communication device 100.

Figure 5:
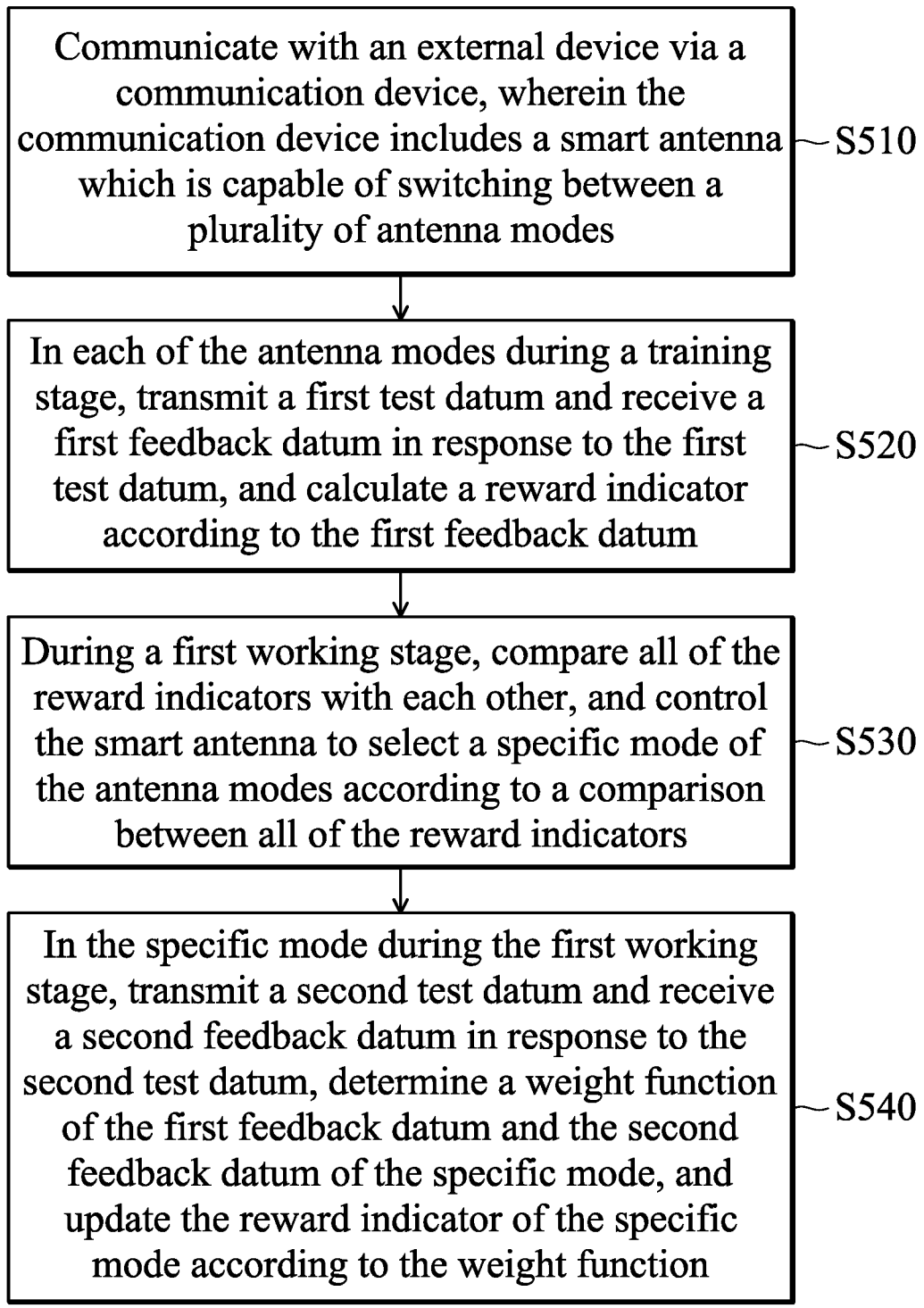
FIG. 5 is a flowchart of a method for antenna selection according to an embodiment of the invention.

FIG. 5 is a flowchart of a method for antenna selection according to an embodiment of the invention. In step S510, an external device is communicated with by a communication device. The communication device includes a smart antenna which is capable of switching between a plurality of antenna modes. In step S520, in each of the antenna modes during a training stage, a first test datum is transmitted and a first feedback datum is received in response to the first test datum, and a reward indicator is calculated according to the first feedback datum. In step S530, during a first working stage, all of the reward indicators are compared with each other, and the smart antenna is controlled to select a specific mode of the antenna modes according to a comparison between all of the reward indicators. In step S540, in the specific mode during the first working stage, a second test datum is transmitted and a second feedback datum is received in response to the second test datum, the weight function of the first feedback datum and the second feedback datum of the specific mode is determined, and the reward indicator of the specific mode is updated according to the weight function. It should be understood that the above steps are not required to be performed in order, and every device feature of the embodiments of FIGS. 1 to 4 may be applied to the method of FIG. 5.

The invention proposes a novel communication device and a novel method for antenna selection. According to the practical measurements, the proposed design has at least the following advantages over the prior art: (1) enhancing the detection accuracy of the communication device, (2) increasing the identification rate of the communication device, (3) reducing the learning time of the smart antenna of the communication device, and (4) increasing the throughput of the communication device. Therefore, the invention is suitable for application in a variety of time-variant indoor environments.

Note that the above parameters are not limitations of the invention. A designer can fine-tune these settings or values according to different requirements. It should be understood that the communication device and the method of the invention are not limited to the configurations of FIGS. 1-5. The invention may merely include any one or more features of any one or more embodiments of FIGS. 1-4. In other words, not all of the features displayed in the figures should be implemented in the communication device and the method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device for communicating with an external device, comprising:
    a smart antenna, wherein the smart antenna is capable of switching between a plurality of antenna modes;
    a storage device; and
    a processor;
    wherein in each of the antenna modes during a training stage, the smart antenna transmits a first test datum and receives a first feedback datum in response to the first test datum, the processor calculates a reward indicator according to the first feedback datum, and the storage device stores the reward indicator;
    wherein during a first working stage, the processor compares all of the reward indicators with each other and controls the smart antenna to select a specific mode of the antenna modes according to a comparison between all of the reward indicators;
    wherein in the specific mode during the first working stage, the smart antenna transmits a second test datum and receives a second feedback datum in response to the second test datum, the processor determines a weight function of the first feedback datum and the second feedback datum of the specific mode, and the processor updates the reward indicator of the specific mode according to the weight function.

2. The communication device as claimed in claim 1, wherein the antenna modes comprise different radiation patterns of the smart antenna.

3. The communication device as claimed in claim 1, wherein the antenna modes comprise different polarization directions of the smart antenna.

4. The communication device as claimed in claim 1, wherein the first feedback datum and the second feedback datum comprise RSSI (Received Signal Strength Indicator), EVM (Error Vector Magnitude), or goodput measured from the external device.

5. The communication device as claimed in claim 1, wherein during a second working stage after the first working stage, the processor further compares all of the reward indicators with each other and controls the smart antenna to update the specific mode according to an updated comparison between all of the reward indicators.

6. The communication device as claimed in claim 1, wherein the reward indicator of an i-th antenna mode is updated according to the following equation:

$$\overline{R_1}(n) = \frac{(r^{n_i(n-1)} - 1) \cdot \overline{R_1}(n-1) + r^{n_i(n-1)} \cdot (r-1) \cdot R_i(n)}{r^{n_i(n-1)+1} - 1}$$

wherein "$\overline{R}_1(n)$" represents the updated reward indicator of the i-th antenna mode, "n" represents a current time integer, "$n_i$" represents a total selection number of the i-th antenna mode, "$\overline{R}_1(n-1)$" represents an average of historical reward indicators of the i-th antenna mode measured during a time interval from a 1st time frame to a (n−1)-th time frame, "$R_i(n)$" represents a current reward indicator of the i-th antenna mode measured in an n-th time frame, and "r" represents a weighting parameter.

7. The communication device as claimed in claim 6, wherein the current time integer and the total selection number are determined according to the following equation:

$$n = \sum_{i=1}^{N} n_i$$

wherein "N" represents a total number of the antenna modes.

8. The communication device as claimed in claim 6, wherein the weighting parameter is greater than 1.

9. The communication device as claimed in claim 1, wherein the specific mode corresponds to a maximum of all of the reward indicators.

10. A method for antenna selection, comprising the steps of:
  communicating with an external device via a communication device, wherein the communication device comprises a smart antenna which is capable of switching between a plurality of antenna modes;
  in each of the antenna modes during a training stage, transmitting a first test datum and receiving a first feedback datum in response to the first test datum, and calculating a reward indicator according to the first feedback datum;
  during a first working stage, comparing all of the reward indicators with each other, and controlling the smart antenna to select a specific mode of the antenna modes according to a comparison between all of the reward indicators; and
  in the specific mode during the first working stage, transmitting a second test datum and receiving a second feedback datum in response to the second test datum, determining a weight function of the first feedback datum and the second feedback datum of the specific mode, and updating the reward indicator of the specific mode according to the weight function.

11. The method as claimed in claim 10, wherein the antenna modes comprise different radiation patterns of the smart antenna.

12. The method as claimed in claim 10, wherein the antenna modes comprise different polarization directions of the smart antenna.

13. The method as claimed in claim 10, wherein the first feedback datum and the second feedback datum comprise RSSI (Received Signal Strength Indicator), EVM (Error Vector Magnitude), or goodput measured from the external device.

14. The method as claimed in claim 10, further comprising:
  during a second working stage after the first working stage, comparing all of the reward indicators with each other, and controlling the smart antenna to update the specific mode according to an updated comparison between all of the reward indicators.

15. The method as claimed in claim 10, wherein the reward indicator of an i-th antenna mode is updated according to the following equation:

$$\overline{R_1}(n) = \frac{(r^{n_i(n-1)} - 1) \cdot \overline{R_1}(n-1) + r^{n_i(n-1)} \cdot (r-1) \cdot R_i(n)}{r^{n_i(n-1)+1} - 1}$$

wherein "$\overline{R}_1(n)$" represents the updated reward indicator of the i-th antenna mode, "n" represents a current time integer, "$n_i$" represents a total selection number of the i-th antenna mode, "$\overline{R}_1(n-1)$" represents an average of historical reward indicators of the i-th antenna mode measured during a time interval from a 1st time frame to a (n−−1)-th time frame, "$R_i(n)$" represents a current reward indicator of the i-th antenna mode measured in an n-th time frame, and "r" represents a weighting parameter.

16. The method as claimed in claim 15, wherein the current time integer and the total selection number are determined according to the following equation:

$$n = \sum_{i=1}^{N} n_i$$

wherein "N" represents a total number of the antenna modes.

17. The method as claimed in claim 15, wherein the weighting parameter is greater than 1.

18. The method as claimed in claim 10, wherein the specific mode corresponds to a maximum of all of the reward indicators.

* * * * *